(12) United States Patent
Chien et al.

(10) Patent No.: US 8,462,670 B2
(45) Date of Patent: Jun. 11, 2013

(54) INTERNET BASED COMMUNICATION SYSTEM AND METHOD (75) Inventors: Ming Liang Chien, Singapore (SG); Yew Meng Kok, Singapore (SG); Junda Ong, Singapore (SG)

(73) Assignee: Hoiio Pte. Ltd, Singapore (SG)

( * ) Notice: Subject to any disclaimer, the term of this patent is extended or adjusted under 35 U.S.C. 154(b) by 239 days.

(21) Appl. No.: 12/999,351

(22) PCT Filed: Jun. 8, 2009

(86) PCT No.: PCT/SG2009/000202
§ 371 (c)(1), (2), (4) Date: Feb. 11, 2011

(87) PCT Pub. No.: WO2009/154574
PCT Pub. Date: Dec. 23, 2009

(65) Prior Publication Data
US 2011/0141949 A1    Jun. 16, 2011

(30) Foreign Application Priority Data
Jun. 16, 2008 (SG) ............... 200804570-0

(51) Int. Cl.
*H04L 12/16* (2006.01)
*H04L 12/66* (2006.01)

(52) U.S. Cl.
USPC .......................................... 370/260; 370/352

(58) Field of Classification Search
USPC ................. 370/259–262, 352–356
See application file for complete search history.

(56) References Cited

U.S. PATENT DOCUMENTS

| | | | |
|---|---|---|---|
| 6,628,647 B1 | 9/2003 | Chua et al. | |
| 6,694,007 B2 | 2/2004 | Lang et al. | |
| 6,944,278 B1 | 9/2005 | Nielsen | |
| 7,272,386 B2 | 9/2007 | Meer | |
| 7,844,034 B1 * | 11/2010 | Oh et al. | 379/45 |
| 7,962,644 B1 * | 6/2011 | Ezerzer et al. | 709/238 |
| 2003/0095542 A1 * | 5/2003 | Chang et al. | 370/352 |
| 2003/0133421 A1 * | 7/2003 | Sundar et al. | 370/328 |
| 2003/0223571 A1 | 12/2003 | Dezonno | |
| 2005/0021345 A1 * | 1/2005 | Rotella et al. | 705/1 |
| 2006/0023657 A1 * | 2/2006 | Woodson et al. | 370/328 |

(Continued)

FOREIGN PATENT DOCUMENTS

| | | |
|---|---|---|
| JP | 2002-314710 A | 10/2002 |
| JP | 2004260451 A | 9/2004 |
| WO | 2005/122541 A2 | 12/2005 |

OTHER PUBLICATIONS

International Search Report issued in PCT/SG2009/000202, mailed on Sep. 9, 2009, 3 pages.

(Continued)

*Primary Examiner* — Hong Cho
(74) *Attorney, Agent, or Firm* — Osha • Liang LLP (57) ABSTRACT

A method of establishing a phone conversation between an initiator's device and a destination device and an Internet based communication system. The method comprises the steps of instructing one or more internal private branch exchange (PBX) telephone network/s to initiate separate calls to the initiator's device and the destination device respectively using existing termination option/s of the PBX network/s over an Internet network based system; and bridging of the two separate calls to establish a phone conversation between the initiator's device and the destination device.

19 Claims, 9 Drawing Sheets

U.S. PATENT DOCUMENTS

| | | |
|---|---|---|
| 2006/0072729 A1* | 4/2006 | Lee et al. ............... 379/202.01 |
| 2006/0187904 A1 | 8/2006 | Oouchi |
| 2007/0019614 A1* | 1/2007 | Hoffmann ..................... 370/352 |
| 2007/0092073 A1 | 4/2007 | Olshansky et al. |
| 2007/0110043 A1* | 5/2007 | Girard ........................... 370/352 |
| 2007/0183405 A1* | 8/2007 | Bennett ......................... 370/352 |
| 2008/0240081 A1* | 10/2008 | Sindhwani ................... 370/352 |

OTHER PUBLICATIONS

Written Opinion issued in PCT/SG2009/000202, mailed on Sep. 9, 2009, 6 pages.

International Preliminary Report on Patentability issued in PCT/SG2009/000202, mailed on May 19, 2010, 8 pages.

* cited by examiner

INTERNET BASED COMMUNICATION SYSTEM AND METHOD

FIELD OF INVENTION

The present invention relates broadly to a method of establishing a phone conversation between an initiator's device and a destination device; and to an Internet network based communication system.

BACKGROUND

Currently, the establishment of a telephone call between a mobile cellular phone user and a telephone number or internal extension that exist within an internal private branch exchange (PBX) is done by directly contacting the destination through the public switch telephone network for connection. In cases where the target destination is overseas, the costs of making such calls are high.

To address the cost issue, existing solutions use e.g. Voice over Internet Protocol (VoIP) integrated with the PBX network to reduce the cost of international calling by transmitting the calls over the Internet. However, this method only allows calls to be made using special Internet Protocol (IP) phones or computer-based phones (softphones), thus typically restricting the user to making calls within the office environment only. When a user is on the move outside the office environment, VoIP calls made from the mobile phone are implemented and executed externally from any existing PBX network, i.e. such calls are subjected to conventional charging arrangements associated with the relevant mobile network(s) and/or VoIP gateways.

Example embodiments of the present invention seek to address one or more of the above problems identified by the inventors.

SUMMARY

In accordance with a first aspect of the present invention there is provided a method of establishing a phone conversation between an initiator's device and a destination device, the method comprising the steps of instructing one or more internal private branch exchange (PBX) telephone network/s to initiate separate calls to the initiator's device and the destination device respectively using existing termination option/s of the PBX network/s over an Internet network based system; and bridging of the two separate calls to establish a phone conversation between the initiator's device and the destination device.

Instructing the PBX network/s may comprise providing initiator's information and a destination device number to the PBX network/s.

Said providing step may be performed using one or more of a group consisting of an Internet based application, a messaging service, an electronic mail, a public switch telephone network access point, and a cellular phone.

The method may further comprise downloading and installation of a software application, or the pre-installation of the software application on the initiator's device, or the initiation of the conversation via an Internet website.

The method may comprise the steps of transmission of the destination device number and the initiator's information over a data or audio network, after the initiator has contacted a directory services server via the public switch telephone network via the software application.

The method may further comprise searching, matching, verifying of the initiator information and translation of dialling format for both initiator and destination device number at the directory services server, and, upon completion, the directory services server contacts the PBX network/s.

The directory services server may be implemented within the PBX network/s or outside the PBX network/s.

The method may comprise the steps of transmitting the verified initiator's information and the destination device number as respective call requests to the PBX network/s via a call signaling and media gateway.

The call signaling and media gateway may be implemented within the PBX network/s or outside the PBX network/s.

The termination option/s may contact the initiator's device and request for a hold by the initiator for the establishment of the call.

The method may further comprise the termination option/s contacting the destination device number requesting an audio redirect for both the call to the initiator's device and the call to the target destination device.

The destination device may be covered on a different PBX network than the initiator's device.

If the call signaling and media gateway is implemented within the PBX network/s, the bridging of the two separate calls to establish a phone conversation between the initiator's device and the destination device may be performed by the call signaling and media gateway.

If the call signaling and media gateway is implemented or outside the PBX network/s, the bridging of the two separate calls to establish a phone conversation between the initiator's device and the destination device may be performed by a PBX of the PBX network/s.

In accordance with a second aspect of the present invention there is provided a Internet network based communication system comprising means for instructing one or more internal private branch exchange (PBX) telephone network/s to initiate separate calls to an initiator's device and a destination device respectively using existing termination option/s of the PBX network/s; and means for bridging the two separate calls to establish a phone conversation between the initiator's device and the destination device.

The system may comprise a directory services server for authentication and verification of an initiator's information and a destination device for look up of respective PBX network's to which the initiator and the destination device belong to and for translating number dialing formats of different PBX networks.

The system may comprise a calling signaling and media gateway as receiver and transmitter of information, and for translating the information to a format for receipt by a PBX of the PBX network/s or by one or more other calling signaling and media gateway/s.

The directory services server and the signaling and media gateway may be implemented as a single entity, or may be implemented separately.

The directory services server may be connected directly to a PBX of the PBX network/s or to one or more signaling and media gateway/s implemented within or outside the PBX network/s.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The described example embodiments provide an Internet network based telephone call handling method and system in which a phone call between an individual via for example the public switch telephone network with a specific private branch exchange (PBX) of an internal network or intranet is established, and the details of the particular phone call are routed to the private branch exchange over the Internet layer to the target user's destination, and the establishment of the telephone conversation is completed over the public switch telephone network. The call initiation methods and systems in the example embodiments allow for calling any public telephone number, PBX network's internal extensions or telephone number with for example a cellular phone at any physical location, riding on the initiator's specific PBX connection options, resulting in reduced cost routing, and thus cost savings for the initiator.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

An example embodiment includes the use of a directory services server, a call signalling and media gateway within the caller and/or callee's PBX network, and components of a PBX network (PBX and termination options) to establish the conversation between an initiator and a destination over the Internet.

The example embodiments allow calling any public telephone number, PBX network's internal extensions or telephone number with a cellular phone at any physical location, riding on the initiator's specific PBX connection options, resulting in reduced cost routing, and thus cost savings for the initiator.

The initiation of the phone call may be done by the use of the Internet, Short Messaging Service, electronic mail, public switch telephone network access point, cellular phone or any other means whereby the initiator's cellular phone number, and the caller's telephone number are conveyed to the target private branch exchange network via an Internet network based phone information forwarding system. In one embodiment, the process involves the download and installation of a software application, or the pre-installation of the software on the initiator's telephone system, or the initiation of the conversation via an Internet website.

The Internet network based telephone conversation information forwarding system and method in an example embodiment consists of 5 layers or phases: a service lookup and authentication phase, a initiator call dispatch phase, an initiator internal PBX network receipt and termination phase, a callee call dispatch phase, and a callee internal PBX network receipt and termination phase.

Figure 1:
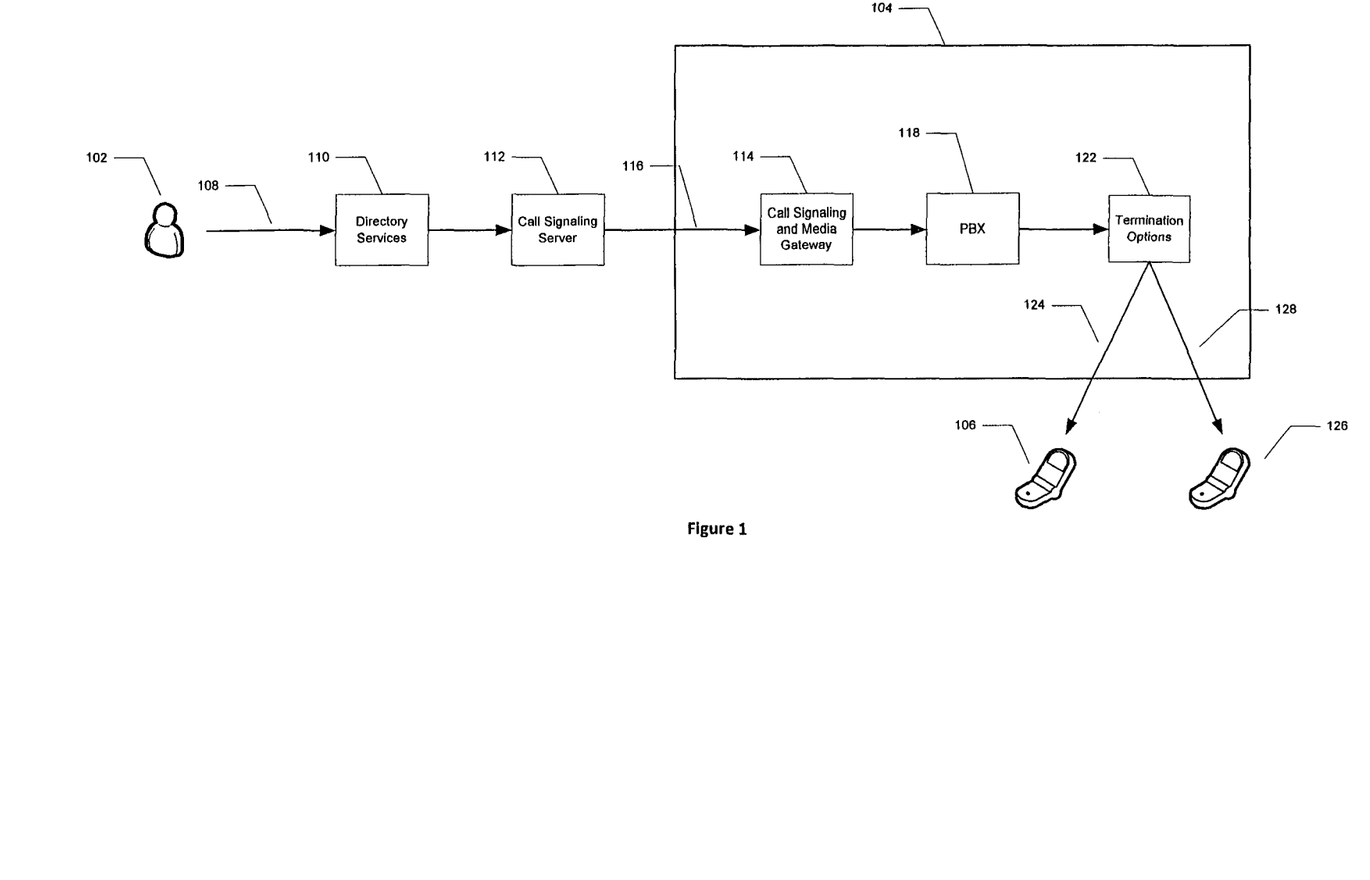
FIG. 1 shows a schematic drawing illustrating a process flow and system components according to an example embodiment.

FIG. 1 shows a schematic drawing illustrating a process flow and system components according to an example embodiment.

An existing user 102 of a PBX site location 104, typically a corporate environment or office, is on the move outside the PBX location 104 and with access to his mobile phone 106. The user 102 initiates a call request 108 through a web graphical user interface, SMS, email, access number dial-in, mobile software application or other means. The user's 102 mobile number and the destination number of the call request are transmitted to a Centralized Directory Services server 110. The Centralized Directory Services server 110 authenticates the user 102 and looks up the correct PBX site location 104 that the user belongs to. This information is passed to the Call Signaling Server 112 which sends the request for a callback to the Localized Call Signaling and Media Gateway 114 located at the PBX site location 104 through an Internet layer 116. It will be appreciated that the Call Signaling Server 112 may also be referred to as a Gateway. The Localized Call Signaling and Media Gateway 114 forwards the request to the existing PBX 118 which performs a callback to the user's mobile 106 number using existing available termination options 122. Possible options include PSTN, ISDN or IP, generally indicated at numeral 124.

When the user 102 answers the callback, he will be put on hold. Call Signaling Server 112 then sends the request for the destination to the Localized Call Signaling and Media Gateway 114 located at the PBX site location 104 through the Internet layer 116. The Localized Call Signaling and Media Gateway 114 forwards the request to the existing PBX 118 which calls the destination number 126 using existing available termination options 122. Possible destination numbers 126 include other public telephone number or internal extensions. Possible options include PSTN, ISDN or IP generally indicated at numeral 128. When the destination answers, the two calls are bridged and the audio mixed at the Localized Call Signaling and Media Gateway 114.

Figure 2:
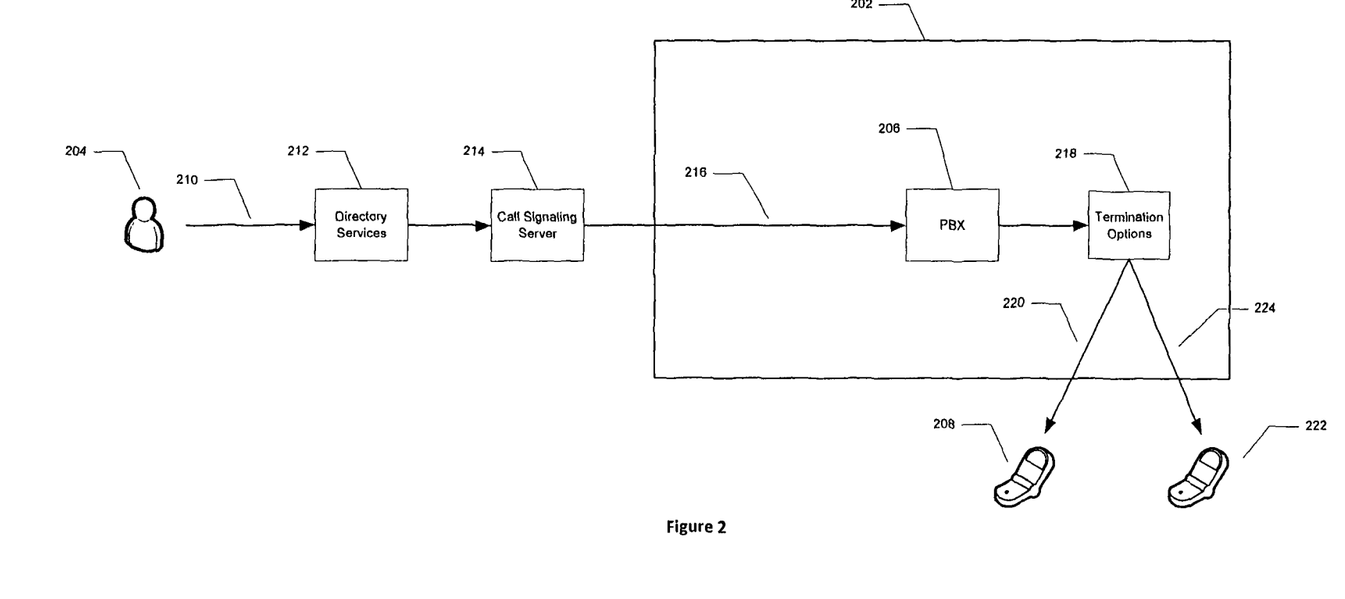
FIG. 2 shows a schematic drawing illustrating a process flow and system components according to an example embodiment.

FIG. 2 is a schematic drawing illustrating the process flow and system components according to another embodiment. Compared to the embodiment described above with reference to FIG. 1, in this example embodiment there is no Localized Call Signaling and Media Gateway at the PBX site location 202. An existing user 204 of the PBX location 202 is on the move outside the PBX location 202 and with access to his mobile phone 208. He makes a call request 210 through a web graphical user interface, SMS, email, access number dial-in, mobile software application or other means. The user's mobile number and the destination number of the call request are transmitted to a Centralized Directory Services server 212. The Centralized Directory Services server 212 authenticate the user and looks up the correct PBX site location 202 that the user belongs to. This information is passed to the Call Signaling Server 214 which sends the request for the callback directly to the PBX 206 through an Internet layer 216. PBX 206 then performs a callback to the user's mobile 208 number using existing available termination options 218. Possible options include PSTN, ISDN or IP 220. When the user 204 answers the callback, he will be put on hold. Call Signaling Server 214 then sends the request for the destination to the PBX 206 which calls the destination number 222 using existing available termination options 218. Possible destination number 222 includes other public telephone number or internal extensions. Possible options include PSTN, ISDN or IP 224. When the destination answers, the two calls are bridged and the audio mixed at the PBX 206. In this embodiment, PBX 206 is able to perform audio mixing when instructed by the Call Signaling Server 214. In this embodiment, the PBX 206 is of a type able to support the redirection of the audio stream between the user's mobile 208 number and the destination number 222 after the call has been established as instructed by the Call Signaling Server 214.

Figure 3:
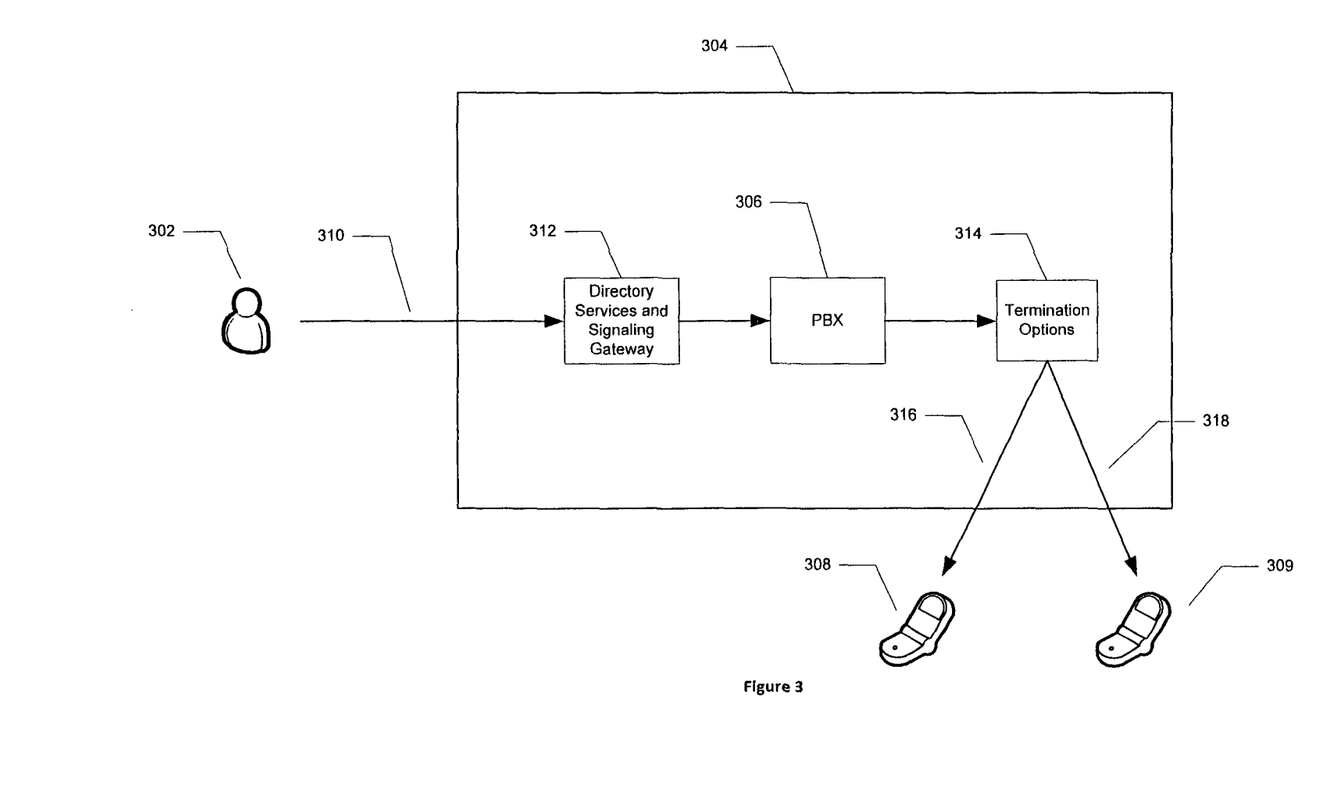
FIG. 3 shows a schematic drawing illustrating a process flow and system components according to an example embodiment.

FIG. 3 is a schematic drawing illustrating the process flow and system components according to another embodiment. Compared to the embodiment described above with reference to FIG. 1, in this example embodiment there is no Centralized Directory Services and Call Signaling Server. An existing user 302 of the PBX location 304 is on the move outside the PBX location 304 and with access to his mobile phone 308. He makes a call request 310 through a web graphical user interface, SMS, email, access number dial-in, mobile software application or other means. It will appreciated that in this embodiment, there is also an Internet layer communication involved as the above stated call request possibilities (whether IP or non-IP) are means to contact a Localized Directory Services and Signaling Gateway 312 to initiate the process. The Localized Directory Services and Signaling Gateway 312 then continues with the process via the Internet layer as follows.

The user's mobile 308 number and the destination number 309 of the call request are transmitted directly to a Localized Directory Services and Signaling Gateway 312. The Directory Services and Signaling Gateway 312 forwards the request to the existing PBX 306 which performs a callback to the user's mobile 308 number using existing available termination options 314. Possible options include PSTN, ISDN or IP 316. When the user 302 answers the callback, he will be put on hold. Localized Directory Services and Signaling Gateway 312 then sends the request for the destination to the existing PBX 306 which calls the destination number 309 using existing available termination options 314. Possible destination number 309 includes other public telephone number or internal extensions. Possible options include PSTN, ISDN or IP 318. When the destination answers, the two calls are bridged and the audio mixed at the Localized Directory Services and Signaling Gateway 312.

Figure 4:
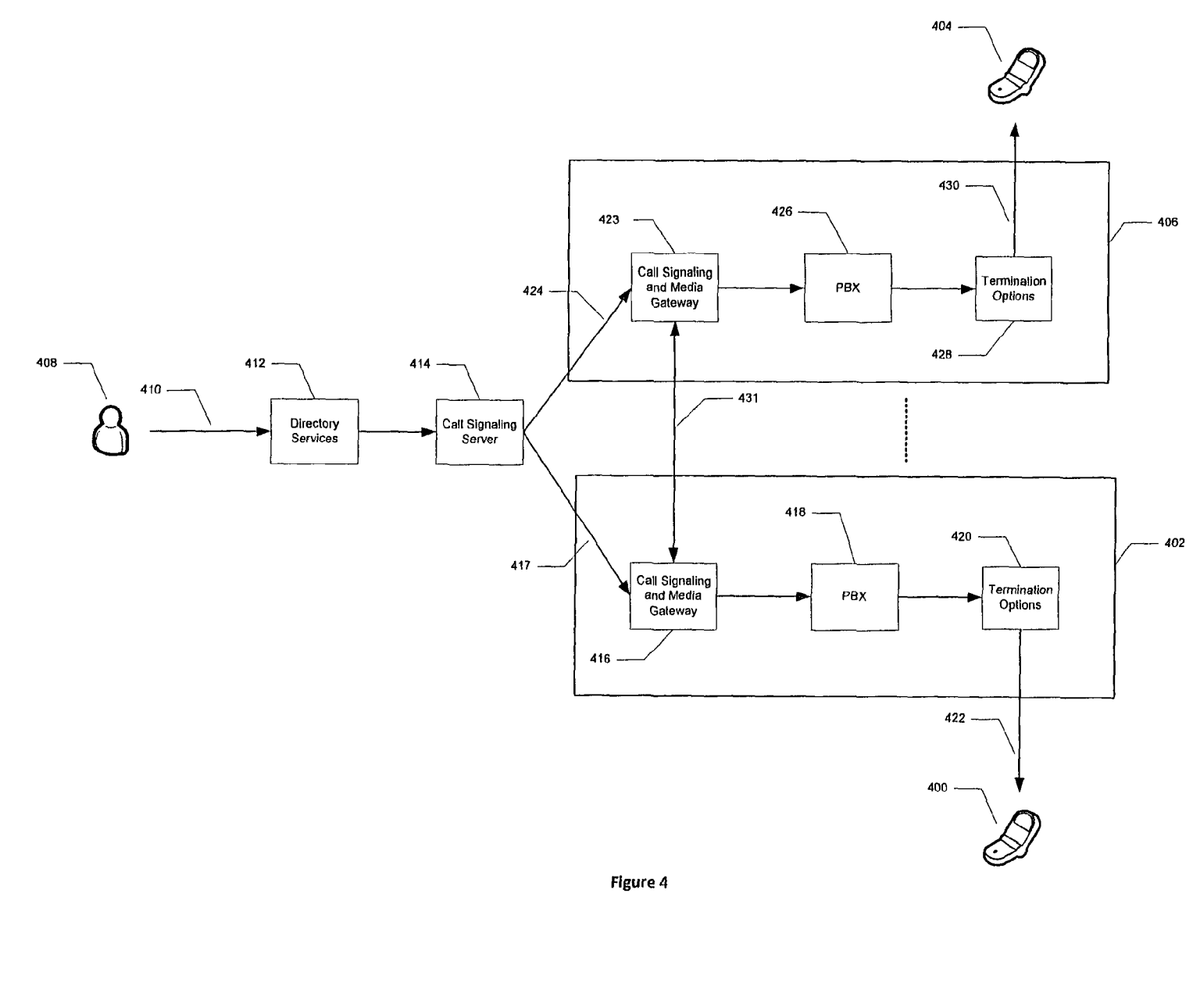
FIG. 4 shows a schematic drawing illustrating a process flow and system components according to an example embodiment.
Figure 5:
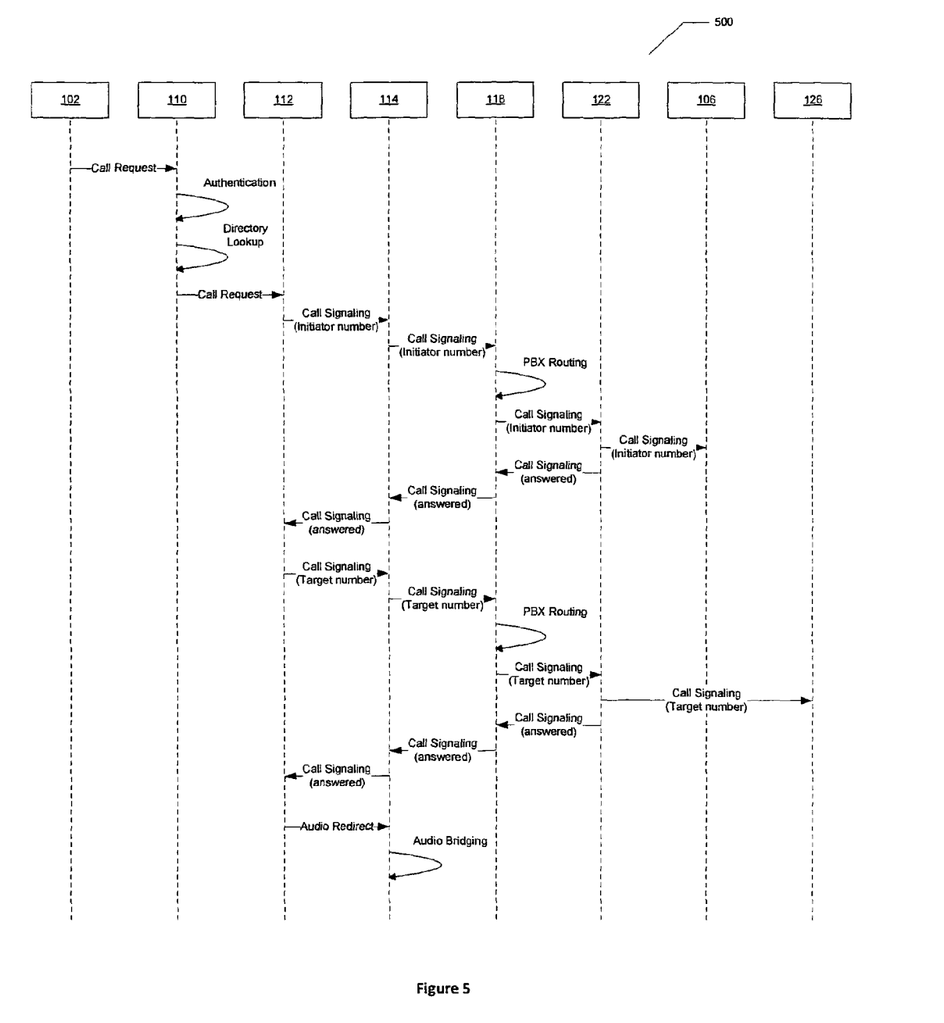
FIGS. 5 to 8 show respective schematic sequence diagrams illustrating the communication sequences for the respective example embodiments described above with reference to FIGS. 1, 2, 3, and 4.
Figure 6:
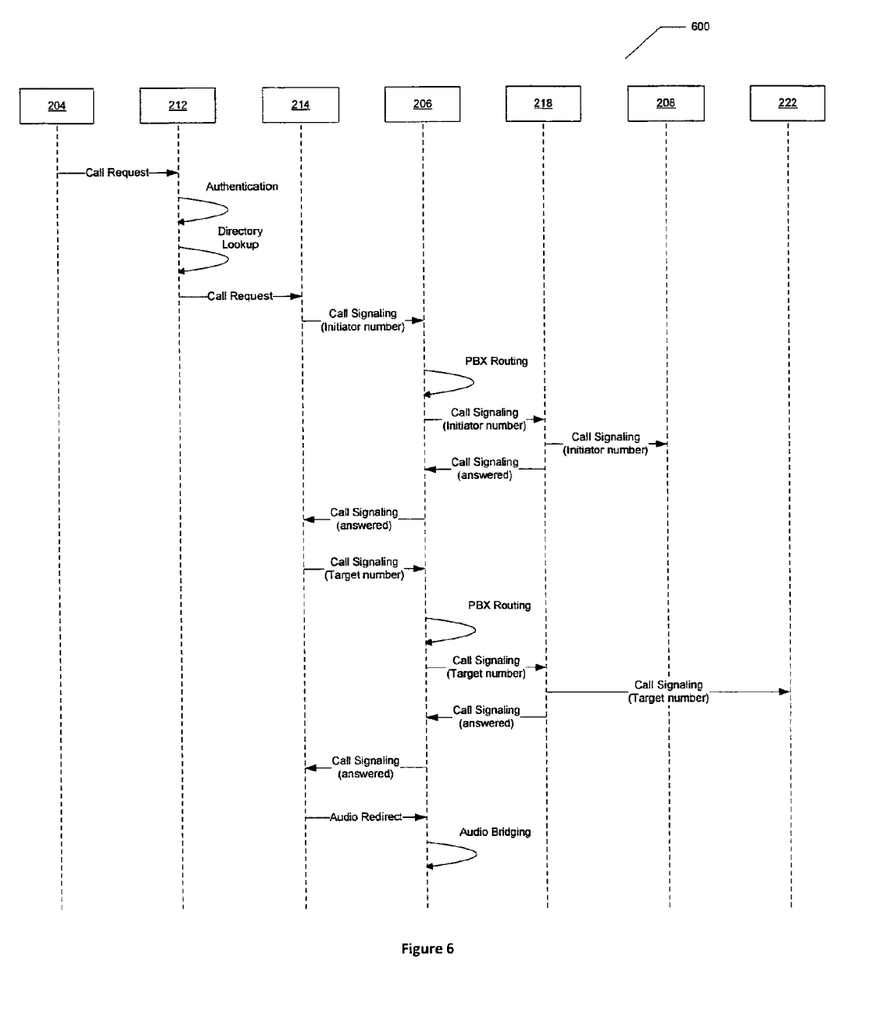
Figure 7:
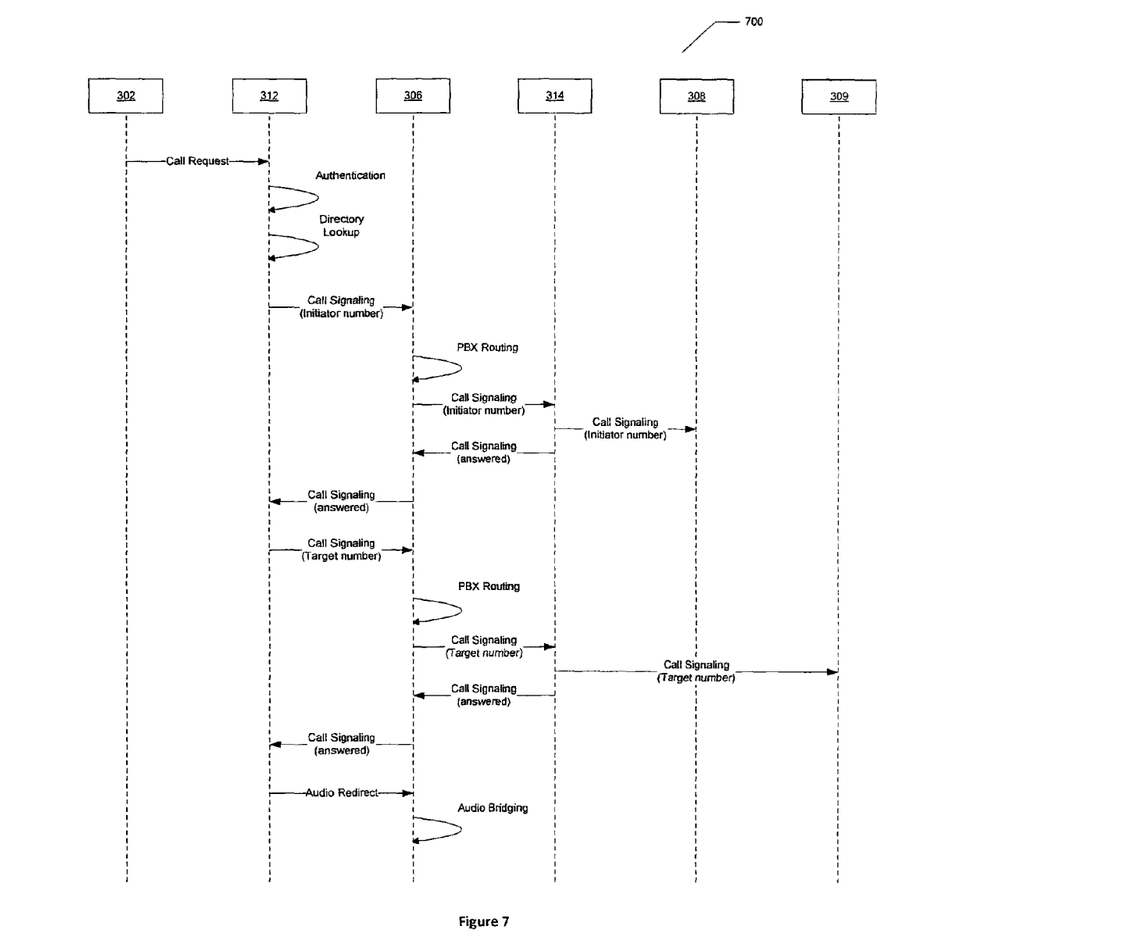
Figure 8:
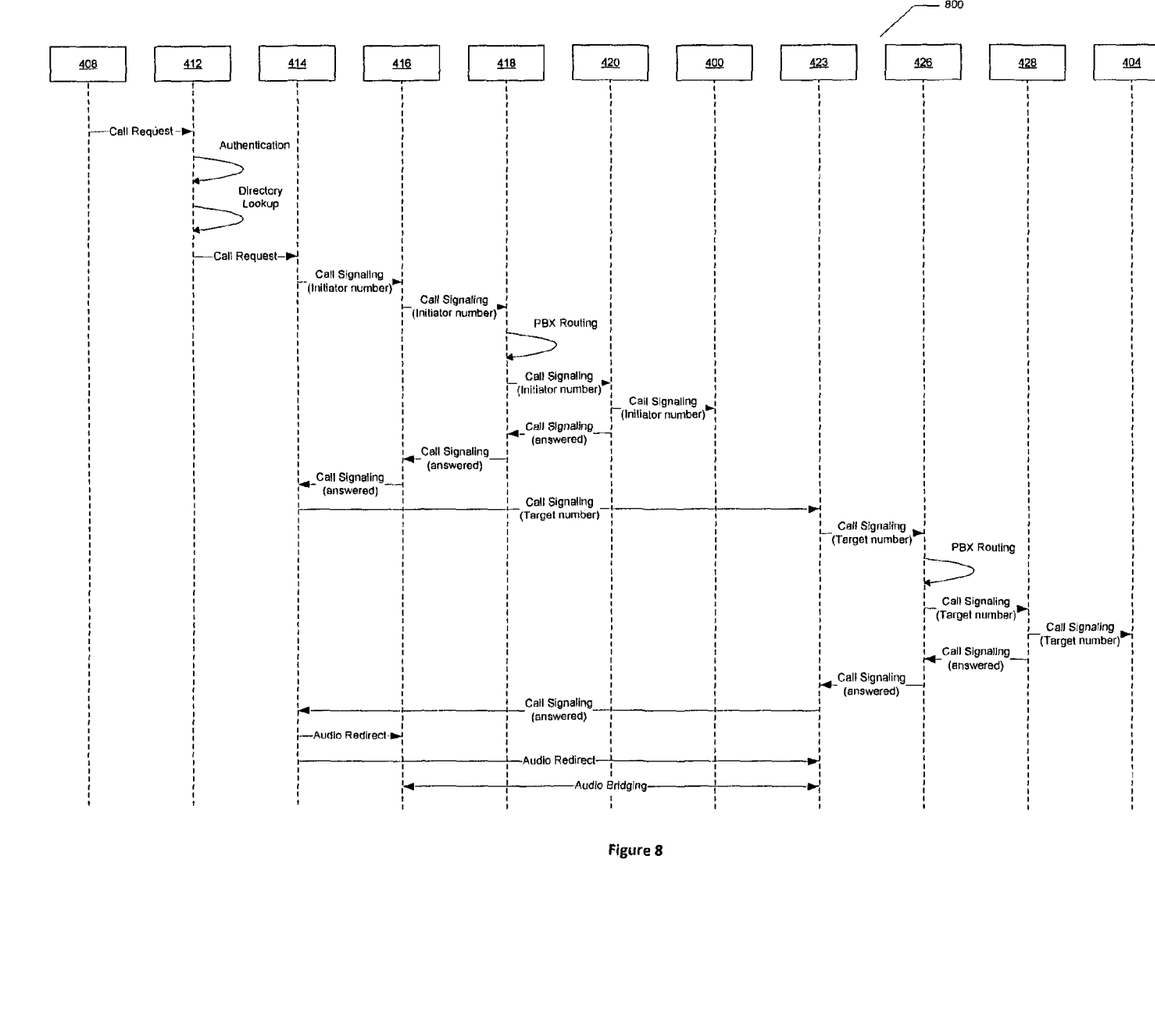

FIG. 4 is a schematic drawing illustrating the process flow and system components according to another embodiment. Compared to the embodiment described above with reference to FIG. 1, in this example embodiment the source 400 number is registered with one PBX environment 402 and the destination 404 is registered with another separate PBX environment 406. An existing user 408 of the PBX site location 402, typically a corporate environment or office, is on the move outside the PBX environment 402 and with access to his mobile phone 400. The user initiate a call request 410 through a web graphical user interface, SMS, email, access number dial-in, mobile software application or other means. The user's mobile 400 number and the destination number 404 of the call request are transmitted to a Centralized Directory Services server 412. The Centralized Directory Services server 412 authenticates the user 408 and looks up the correct PBX site location 402 that the user 408 belongs to. This information is passed to the Call Signaling Server 414 which sends the request for the callback to the Localized Call Signaling and Media Gateway 416 located at the PBX site location 402 through an Internet layer 417. The Localized Call Signaling and Media Gateway 416 forwards the request to the existing PBX 418 which performs a callback to the user's mobile 400 number using existing available termination options 420. Possible options include PSTN, ISDN or IP 422.

When the user answers the callback, he will be put on hold. Call Signaling Server 414 then sends the request for the destination to the Localized Call Signaling and Media Gateway 423 located at the PBX site location 406 through an Internet layer 424. The Localized Call Signaling and Media Gateway 423 forwards the request to the existing PBX 426 which calls the destination 404 number using existing available termination options 428. Possible destination 404 number includes other public telephone number or internal extensions. Possible termination options include PSTN, ISDN or IP 430. When the destination 404 answers, the Call Signaling Server 414 instructs the two Localized Call Signaling and Media Gateways, 416 and 423, to stream the audio directly between them.

FIGS. 5 to 8 show respective schematic sequence diagrams 500, 600, 700, and 800, illustrating the communication sequences for the respective example embodiments described above with reference to FIGS. 1, 2, 3, and 4.

It is noted that in the described embodiments, a translation of the dialing format made by the user on his mobile phone may typically be performed as various different PBXs have their own respective dialing format, for example, the use of a specific prefix to indicate a particular call. Such a translation may for example be conducted to transform the telephone number which the user has input into a format recognized by a particular PBX. This translation can for example be performed by the respective Directory Services components in the described embodiments The method and system components of the example embodiment can be implemented on one or more a computer systems 900, schematically shown in FIG. 9. They may be implemented as software, such as a computer program being executed within computer system(s) 900, and instructing the computer system 900 to conduct the method of the example embodiment.

Figure 9:
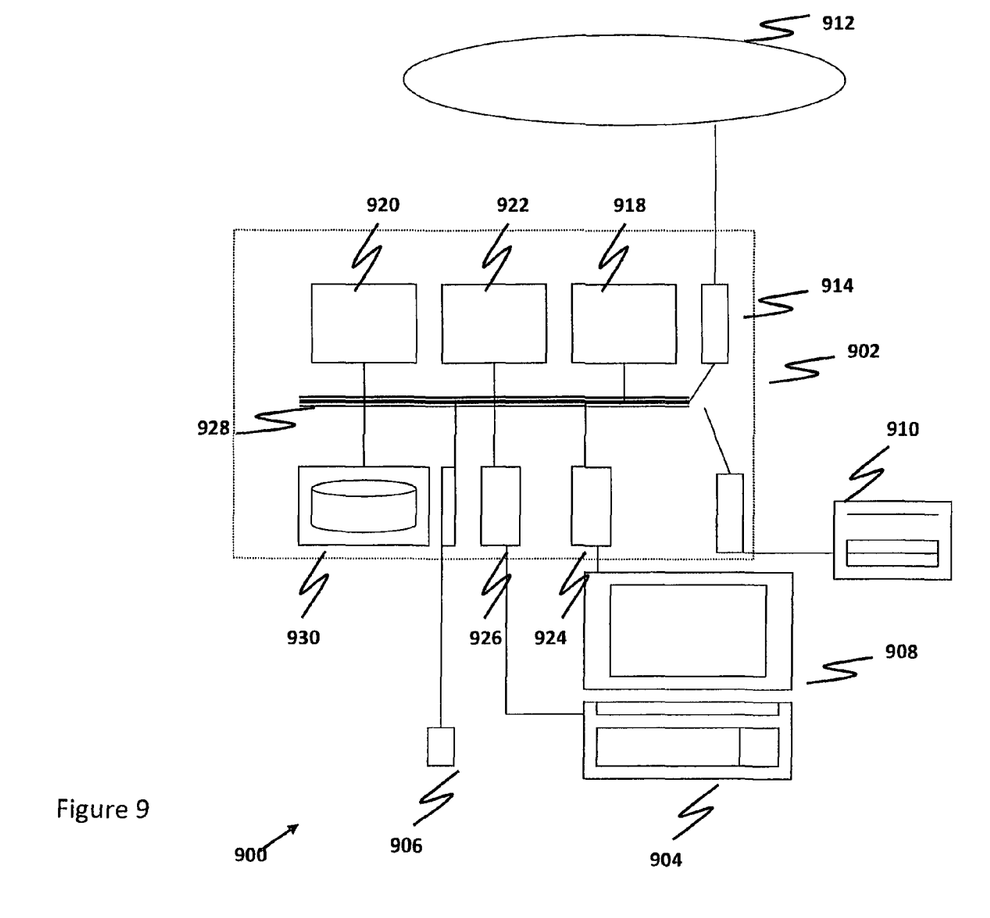
FIG. 9 schematically shows a computer system for implementing the method and system components of an example embodiment.

The computer system 900 comprises a computer module 902, input modules such as a keyboard 904 and mouse 906 and a plurality of output devices such as a display 908, and printer 910.

The computer module 902 is connected to a computer network 912 via a suitable transceiver device 914, to enable access to e.g. the Internet or other network systems such as Local Area Network (LAN) or Wide Area Network (WAN).

The computer module 902 in the example includes a processor 918, a Random Access Memory (RAM) 920 and a Read Only Memory (ROM) 922. The computer module 902 also includes a number of Input/Output (I/O) interfaces, for example I/O interface 924 to the display 908, and I/O interface 926 to the keyboard 904.

The components of the computer module 902 typically communicate via an interconnected bus 928 and in a manner known to the person skilled in the relevant art.

The application program is typically supplied to the user of the computer system 900 encoded on a data storage medium such as a CD-ROM or flash memory carrier and read utilising a corresponding data storage medium drive of a data storage device 930. The application program is read and controlled in its execution by the processor 918. Intermediate storage of program data maybe accomplished using RAM 920.

The example embodiments described can provide to users who are on the move and do not have direct access to their PBX network both the cost-saving benefit of VoIP calls and cost-efficient use of any existing PBX termination options that the caller has access to, such as those available in the user's corporate environment. Seamless integration with the user's existing PBX network can also allow the user to retain other existing benefits of their PBX network such as reduced cost routing and bandwidth savings. To the user, he is able to make calls through their existing PBX network at a fraction of the cost as compared to traditional use of public switch telephone networks and IDD. To the company, this can translate to more cost-efficient use of company resources and reduce call charges incurred by their employees.

The example embodiments allow the establishment of a call between the initiator's phone and the target destination with their respective PBX to contact both the initiator and the target destination via the Internet. The initiator commences the phone call for example over a public switch telephone network (PSTN). For example a directory services server is used to verify, authenticate the required details to trigger calls to the initiator and target destination. The director services server can also handle the translation of the various dialling formats used by the PBX. In some embodiments, a calling and signalling media server can facilitate the transmission of data. Once the initiator and target destination have accepted the call, audio bridging is used to patch the call, resulting in the establishment of the call over a public telephone switch network.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of establishing a phone conversation between an initiator's device and a destination device, the method comprising the steps of:

instructing, over an Internet network based system, at least one internal private branch exchange (PBX) telephone network to initiate a first call to a public telephone number of the initiator's device and a second call to a destination number of the destination device using at least one existing termination option of the at least one telephone PBX network, wherein the first call and the second call are separate calls;

bridging the first call with the second call to establish the phone conversation between the initiator's device and the destination device;

providing initiator's information and the destination number to the Internet network based system; and searching, matching, verifying of the initiator information and translation of a dialing format for both the public telephone number of the initiator's device and the destination number at a directory services server, and, upon completion, the directory services server contacts the at least one PBX telephone network.

2. The method of claim 1, wherein said providing step is performed using at least one selected from a group consisting of an Internet based application, a messaging service, an electronic mail, a public switch telephone network access point, and a cellular phone.

3. The method of claim 2, further comprising at least one selected from a group consisting of downloading and installation of a software application, a pre-installation of the software application on the initiator's device, and an initiation of the phone conversation via an Internet website.

4. The method of claim 3, further comprising the steps of transmission of the destination number and the initiator's information over a data or audio network, after an initiator has contacted the directory services server via at least one selected from a group consisting of a public switch telephone network and the software application.

5. The method of claim 1, wherein the directory services server is implemented within the at least one PBX telephone network or outside the at least one PBX telephone network.

6. The method of claim 1, comprising the steps of transmitting the verified initiator's information and the destination number as respective call requests to the at least one PBX telephone network via a call signaling and media gateway.

7. The method of claim 6, wherein the call signaling and media gateway is implemented within the at least one PBX telephone network or outside the at least one PBX telephone network.

8. The method of claim 7, wherein, if the call signaling and media gateway is implemented within the at least one PBX telephone network, the bridging of the first call with the second call to establish the phone conversation between the initiator's device and the destination device is performed by the call signaling and media gateway.

9. The method of claim 7, wherein, if the call signaling and media gateway is implemented outside the at least one PBX telephone network, the bridging of the first call with the second call to establish a phone conversation between the initiator's device and the destination device is performed by a PBX of the at least one PBX telephone network.

10. The method of claim 1, wherein the at least one termination option contacts the initiator's device at the public telephone number and requests for a hold by an initiator for the establishment of the first call.

11. The method claim 10, further comprising the at least one termination option contacting the destination number and requesting an audio redirect for both the first call to the initiator's device at the public telephone number and the second call to the destination number.

12. The method of claim 1, wherein the destination number is called using a termination option of a different PBX network than the public telephone number of the initiator's device.

13. The method of claim 1, wherein the destination number is an internal extension of the at least one PBX telephone network.

14. The method of claim 1, wherein the destination number is a public telephone number of the destination device.

15. The method of claim 1, wherein the initiator's device comprises a mobile phone.

16. An Internet network based communication system comprising:
  means for instructing at least one internal private branch exchange (PBX) telephone network to initiate a first call to a public telephone number of an initiator's device and a second call to a destination number of a destination device using at least one existing termination option of the at least one PBX telephone network, wherein the first call and the second call are separate calls;
  means for bridging the first call with the second call to establish a phone conversation between the initiator's device and the destination device; and
  a directory services server for authentication and verification of an initiator's information and the destination number for look up of at least one respective PBX network to which the initiator's device and the destination device belong to and for translating into number dialing formats of different PBX networks.

17. The system of claim 16, comprising a calling signaling and media gateway as receiver and transmitter of information, and for translating the initiator's information to a format for receipt by a PBX of the at least one PBX telephone network or by at least one other calling signaling and media gateway.

18. The system of claim 16, wherein the directory services server and the calling signaling and media gateway are implemented as one selected from a group consisting of a single entity and separately.

19. The system of claim 16, wherein the directory services server is connected directly to at least one selected from a group consisting of a PBX of the at least one PBX telephone network and at least one signaling and media gateway implemented within or outside the at least one PBX telephone network.

* * * * *